July 17, 1951 — C. W. SAUNDERS — 2,560,989
METAL-LINED CRATE
Filed Dec. 1, 1947
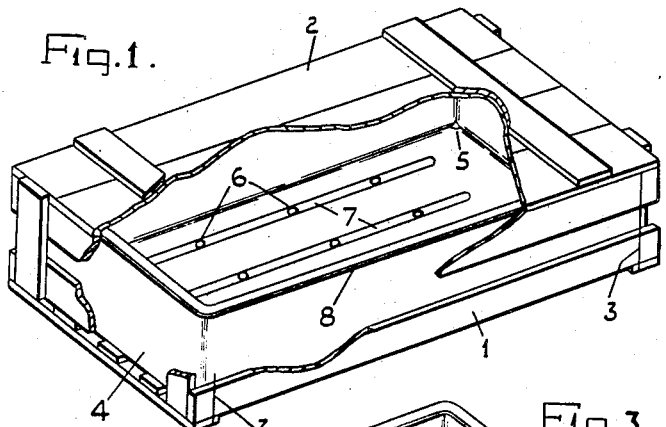
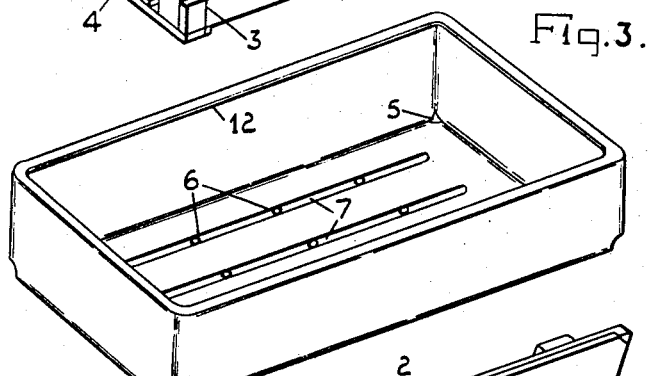
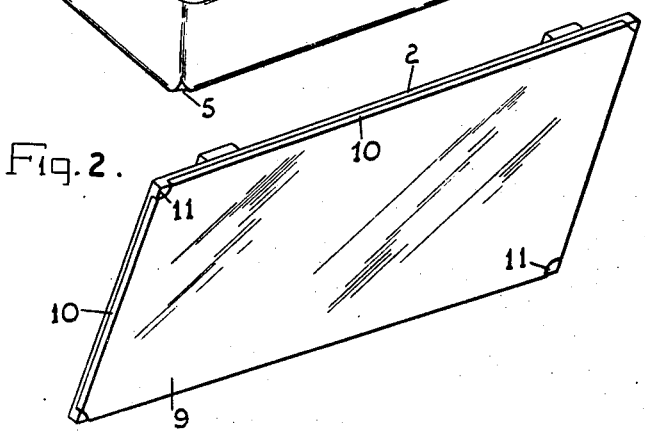
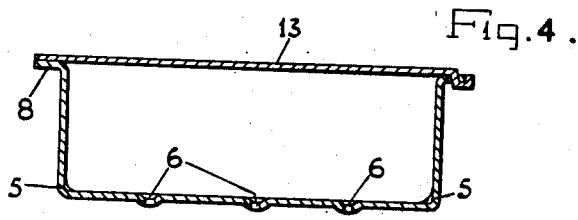
Inventor:
Cyril Walter Saunders,
By: Pierce, Scheffler & Parker,
Attorneys Patented July 17, 1951

2,560,989

UNITED STATES PATENT OFFICE 2,560,989

METAL-LINED CRATE

Cyril Walter Saunders, Dairycoates, Hull, England, assignor of one-half to Hull Merchants Amalgamated Box Company Limited, Dairycoates, Hull, England, a British company Application December 1, 1947, Serial No. 789,049
In Great Britain December 12, 1946

4 Claims. (Cl. 217—3)

This invention relates to boxes and crates, and particularly to those which are to be used more than once for the transport of goods such as perishable food.

Boxes and crates for the above purpose are usually made of wood and as a result it is often difficult to make them serviceable after use due to the difficulty in cleaning out the boxes or crates. This is particularly so in the fish trade where it has been found on return that the boxes have quite often been used for discarded parts of fish with the result that not only is the box inside coated with deleterious matter, but if the boxes have been delayed in transit then there is a very great chance that grubs, maggots, and the like will have been produced. Such boxes are very difficult to clean for re-use and sometimes have to be discarded.

The object of this invention is to produce a more hygienic and more easily cleaned container for perishable goods or the like.

Accordingly a box or crate is furnished with a detachable liner-container capable of being removed easily and subjected to a degreasing and/or cleaning operation. The liner-container may be open topped and closed solely by the lid of the box or crate which may be lined.

The liner-container may be furnished with an inturned flange around its upper rim to prevent the contents from riding up the walls of the container and forcing the lid of the box or container during handling or in transit. Moreover, the liner-container may be furnished with hand grips or handles and these may be integral with or cut out of the walls of the container. Furthermore, drainage holes may be furnished in the bottom of the container.

Referring now to the accompanying drawing in which embodiments of the invention are shown—

Fig. 1 is a part sectional perspective view of a crate with a liner-container therein;

Fig. 2 is a perspective view of the lid of the crate;

Fig. 3 is a perspective view of a modified liner-container; and

Fig. 4 is a sectional transverse view of a lidded liner-container.

In a particular embodiment of the invention shown in Figs. 1 and 2 for fish boxes or crates, the box or crate 1 is made of wood, and of skeleton construction, although the whole or part of such box or crate may be of solid construction. A removable (or hinged) lid 2 is furnished for the box or crate and this may be secured down in any convenient manner. The box or crate is furnished with the usual metallic binding strips or wires 3 to reinforce it and/or secure the lid firmly in position when in use according to known methods.

The above box or crate is furnished with a container 4 which forms a liner therefor and is of open topped construction to fit neatly within the box or crate. Such liner-container can be made of aluminium, thin stainless steel, or any other suitable metal or material which will not contaminate goods placed therein and can be cleaned easily. Preferably, but not necessarily, the container is formed with rounded corners for easy cleaning purposes and a number of drainage holes 5, 6 formed in the bottom of the container. The holes 5 are at the four bottom corners and the holes 6 are in aligned rows, but may be in any other convenient position. The bottom of the box may be grooved at 7 (or otherwise formed) to facilitate the drainage action to the holes 6 which lie in the drainage channels. Also, to facilitate in the removal and handling of the liner-container it may be furnished with hand grips or handles in or on, say, the end walls more or less adjacent the upper rim, although for the relatively shallow type shown they are not necessary. Such hand grips may comprise shaped portions pressed inwardly or outwardly in the walls of the container, or may comprise shaped apertures. Alternatively, hand grips or handles may be riveted or otherwise fastened on to the inside or outside of the walls of the container. The liner-container 4 is furnished with an outwardly turned flange 8 to rest on the upper edge of the crate and form a neat finish. The lid 2 is furnished with a lining 9 on its inner face to provide an easily cleaned face to contact the contents of the liner-container. The lining has upturned flanges 10 about its edges for it to be secured by, say, nails, to the edges of the lid although it may be readily detachable. As boxes or crates of this type are often wet, the corners of the lining 9 are cut away at 11 to facilitate drainage from between the lining and the lid.

The liner-container may be modified as shown in Fig. 3 wherein a retaining flange 12 is preferably formed around the upper rim of the container by turning its rim inwardly into a horizontal, or slightly downwardly inclined plane. Such a flange serves to tend to prevent fish or other bulk goods from riding up the walls of the container and forcing their weight against the lid of the box or crate. If this should happen there may be a tendency for the lid to be forced open particularly in transit or handling.

If desired, as shown in Fig. 4, the liner-container can be furnished with its own lid 13 (of solid, perforated or skeleton construction) detachably hinged thereto, or otherwise held by retaining means, instead of or in addition to the aforesaid flange 12.

An improved box or crate furnished with a removable liner-container as above stated has the advantage that after use the container can be readily removed and put through a degreasing or cleaning plant and thus rendered ready for service in a simple and inexpensive manner. Moreover, the liner will serve to give strength to a box or crate which in itself might be easily damaged. When the parts have been separated for service the box or crate can be repaired quickly where necessary and will be in a reasonably clean state. In any case it will not require a special cleaning operation as hitherto. Moreover, when fish is carried in the liner-container it cannot become water soaked due to the adequate drainage holes 5 and 6. Also, the skeleton crate shown allows free circulation of air round the liner-container which is a primary deterrent to decomposition of the contents.

What I claim is:

1. A reusable shipping container for iced fish or other perishable food products adapted to be stacked with similar containers in transit comprising a flat rectangular slotted wooden crate, a removable open topped rectangular sheet metal inner container sized to fit snugly within said crate and forming a reinforcing lining therefor, said inner metal container having drainage openings in the bottom thereof, said crate including a flat lid having an imperforate sheet metal liner which forms a cover for the inner container when the lid is in closing position on the crate, whereby liquid drained from the inner metal container will run off over the outside of lower containers in a stack thereof.

2. A shipping container according to claim 1 in which the sheet metal liner for the lid of the crate is provided with drainage passages at the corners for the discharge of moisture from between the lid and lid liner.

3. A shipping container according to claim 1 in which the sheet metal inner container is provided with an inturned flange extending around the upper rim thereof to form a stop for the contents thereof which tend to ride up the walls of the inner container, whereby to prevent lifting of the edges of the lid by the contents.

4. A reusable shipping container as defined in claim 1 in which the sheet metal inner container is provided with drainage channels leading to the respective drainage openings therein to facilitate the rapid discharge of liquid from the bottom thereof.

CYRIL WALTER SAUNDERS.

REFERENCES CITED

The following references are of record in the file of this patent:

UNITED STATES PATENTS

| Number | Name | Date |
|---|---|---|
| 100,286 | Green | Mar. 1, 1870 |
| 108,989 | Elson | Nov. 8, 1870 |
| 199,405 | Biye | Jan. 22, 1878 |
| 281,374 | Kivitts | July 17, 1883 |
| 612,578 | Smyth | Oct. 18, 1898 |
| 843,745 | Gregg | Feb. 12, 1907 |
| 1,268,164 | Schneider | June 4, 1918 |
| 1,933,869 | Mosesian | Nov. 7, 1933 |
| 2,135,956 | Woodall | Nov. 8, 1938 |